UNITED STATES PATENT OFFICE.

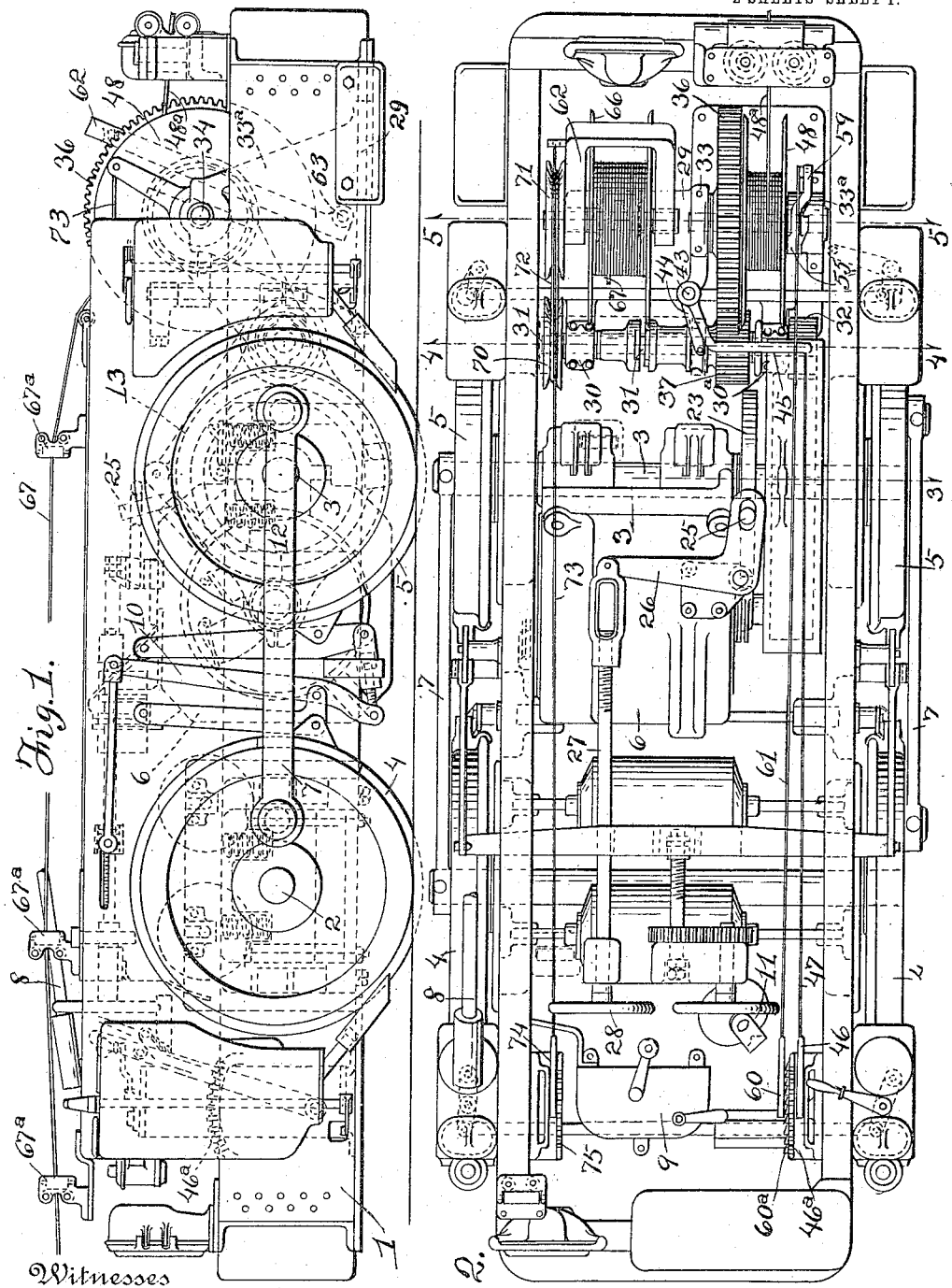

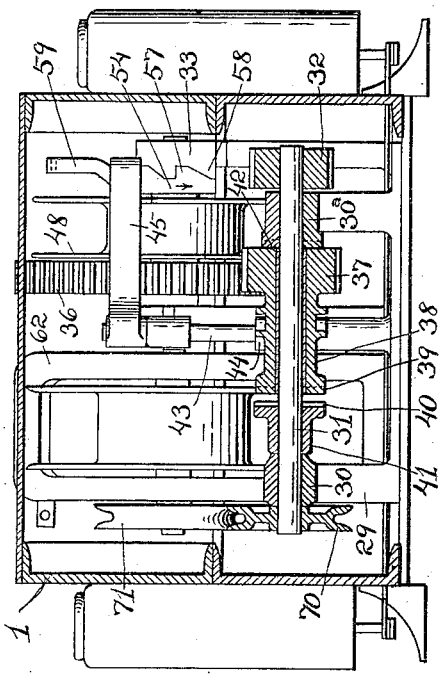
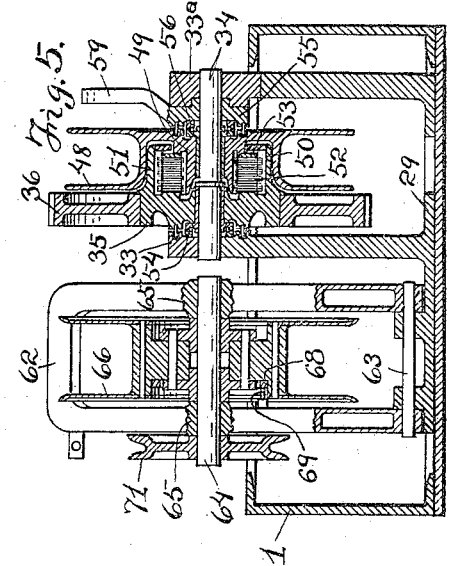
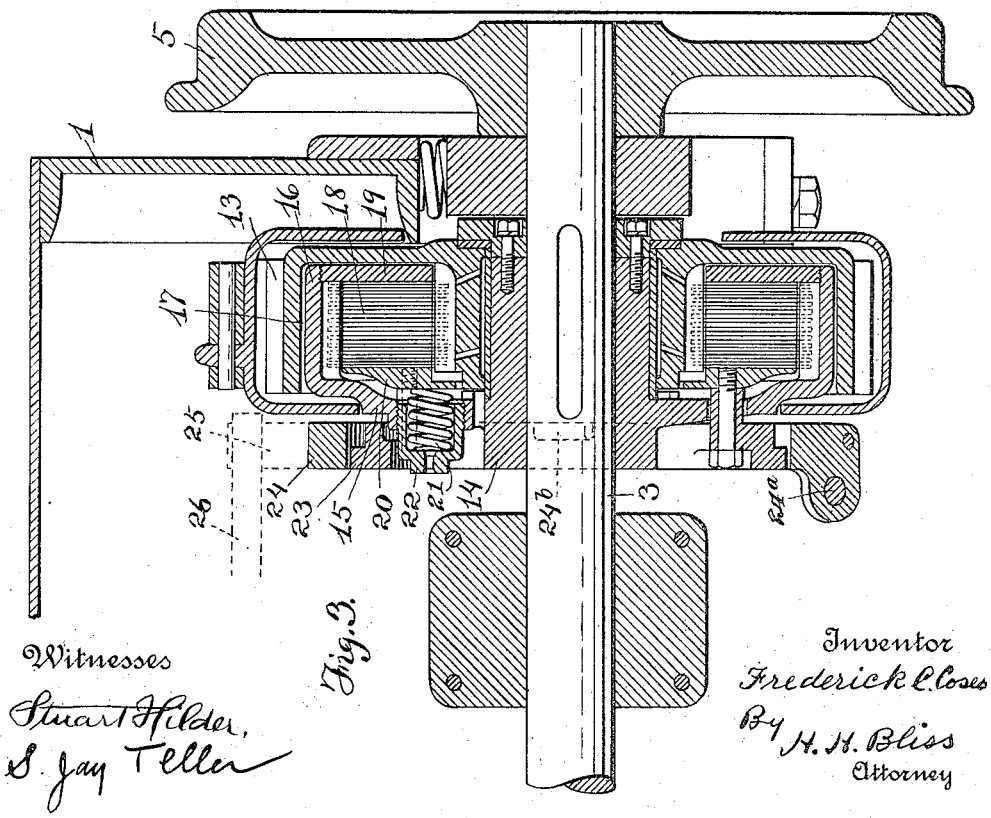

FREDERICK C. COSEO, OF COLUMBUS, OHIO, ASSIGNOR TO THE JEFFREY MANUFACTURING COMPANY, A CORPORATION OF OHIO.

ELECTRIC LOCOMOTIVE.

1,124,211.  Specification of Letters Patent.  Patented Jan. 5, 1915.

Application filed July 29, 1911. Serial No. 641,195.

*To all whom it may concern:*

Be it known that I, FREDERICK C. COSEO, citizen of the United States, residing at Columbus, in the county of Franklin and State of Ohio, have invented certain new and useful Improvements in Electric Locomotives, of which the following is a specification, reference being had therein to the accompanying drawings.

This invention relates to electric locomotives and more especially to locomotives provided with reels or drums for winding and unwinding haulage cables and also with reels or drums for winding and unwinding electric conductor cables.

Locomotives of the class to which my invention relates are especially adapted for use in and about coal and similar mines. In mines of this character there are many side entries and rooms which are provided with tracks, but which are not provided with trolley wires or other electric conductors. When it is desired to run a locomotive into one of these side entries or rooms to remove cars therefrom the conductor cable is connected at its free end with the trolley wire in the main mine entry and current is conducted through the cable to the locomotive motor. As the locomotive advances the cable is unwound from its reel and as the locomotive returns the cable is automatically rewound upon the reel. Sometimes, however, it is not desirable to move the locomotive into the side entries or rooms and, in these cases, use is made of the haulage cable, the free end of which is carried into the said entry or room and secured to a car. The cable is then rewound upon its drum and the car is hauled out. The haulage cable may also be used, when secured to a fixed anchorage, for hauling the locomotive itself.

The object of my invention is to provide a locomotive which has an improved winding mechanism having a drum for a conductor cable and a drum for a haulage cable.

The invention consists in certain improved driving and controlling mechanism and certain new and useful details and arrangement of parts, which will be fully understood from the following specification.

Of the drawings, Figure 1 is a side elevation of a locomotive embodying my invention; Fig. 2 is a plan view of the locomotive with the top cover removed in order to show the operative parts more clearly; Fig. 3 is a fragmentary cross sectional view taken along the line 3—3 of Fig. 2; Fig. 4 is a cross sectional view taken along the line 4—4 of Fig. 2; Fig. 5 is a cross sectional view taken along the line 5—5 of Fig. 2.

Referring to the drawings, 1 represents the main frame of the locomotive, which may, if preferred, be formed of structural steel, as indicated in the drawings. The frame is supported by means of springs on suitable bearings on the axles 2 and 3. The axles 2 and 3 have secured to them the track wheels 4, 4 and 5, 5.

6 is a motor one end of which is mounted on one of the axles, as, for instance, 3, and the other end of which is suitably supported on the main frame of the locomotive. By means of suitable gearing, which will be described in detail hereinafter, the motor is connected with the axle 3 to rotate it together with the track wheels 5, 5.

In order that use may be made of the entire weight of the locomotive to secure tractive force the two sets of wheels 4, 4 and 5, 5 are connected by means of suitable connecting rods 7, 7. The locomotive is equipped with the usual trolley pole 8, the usual controller 9 for the motor 6, and a brake mechanism such as is indicated by 10. The brake mechanism is controlled by means of a hand wheel 11 at the operator's end of the locomotive.

The shaft of the motor 6 has secured to it a pinion 12 which meshes with a gear 13 rotatably mounted on a hub 14 which is keyed to the axle 3. The hub 14 carries a radial web 15 upon which is a flange 16 which extends into the outer part of a suitable annular recess 17 in the gear 13. In this recess are located a number of disks 18 forming a friction clutch. The disks are arranged in two series, the disks of one series alternating with those of the other. The disks of one series are suitably keyed, or otherwise secured, to the gear 13 at the inner part of the recess 17 and the disks of the other series are suitably keyed, or otherwise secured, to the flange 16, on the hub 14. The disks are held against longitudinal movement at one end by a plate 19 secured to the flange 16. At the other end of the two series of disks is a plate 20 arranged to press the disks into close engagement with each other. Springs 21 each engage at one end with a socket 22 secured in the web 15 and at the other end with the plate 20 to force it into engagement with the disks. Mounted outside of the web 15 is a ring 23 which is secured to the plate 20 by means of suitable bolts. A second non-rotating ring 24 is pivotally mounted at 24ª at its lower end and at its upper end carries a pin 25 which extends through a slot at the end of one arm of a bell-crank 26. The other end of the bell-crank may be moved by means of the threaded rod 27 and the hand wheel 28. The ring 24 has bosses 24ᵇ positioned to engage the ring 23 at points in substantially horizontal alinement with the axle to move the ring 23 to cause the plate 20 to be moved out of engagement with the disks 18. When the pressure on the disks 18 is released the gear 13 is left free to rotate with respect to the axle. A locomotive operator, therefore, by turning the hand wheel 28 may engage or release the clutch and connect or disconnect the motor 6 and the axle 3.

At the end of the locomotive opposite to that upon which the operator and the controlling devices are positioned is located the reeling mechanism. The entire reeling mechanism is mounted upon a single pedestal 29 which is suitably supported on the locomotive frame. In bearings 30, 30ª on the rear side of the pedestal there is mounted a transverse shaft 31. At one end of the shaft is a gear 32 which meshes with the gear 13 on the axle 3, and thus serves to cause the rotation of the shaft 31 whenever the motor 6 is in operation.

Mounted in standards 33, 33ª on the pedestal 29 is a transverse shaft 34 which is preferably non-rotatable. Rotatably mounted on the shaft 34 near one of the pedestals preferably the inner one, is a hub 35 to which is secured a gear 36. Rotatably and slidably mounted on the shaft 31 is a pinion 37. This pinion has a sleeve or collar 38 extending from one side. This collar is provided with clutch teeth 39 adapted to engage and mesh with clutch teeth 40 on a collar 41 rigidly secured to the shaft 31. The pinion 37 has at its other end clutch teeth similar to the clutch teeth 39 which are adapted to engage with clutch teeth 42 on the end of the bearing 30ª.

43 is a vertical rock shaft which carries near its lower end a forked lever 44 having pins arranged to engage an annular groove in the sleeve 38 to move the sleeve and the pinion longitudinally on the shaft 31.

45 is a lever for rocking the shaft 43. The lever 45 may be moved by the operator by means of a hand lever 46, which is connected with the lever 45 by means of a link 47. The lever 46 may be locked by engagement with a segment 46ª. The operator, therefore, by moving the lever 46 may lock the gear 37 to the shaft 31 to be rotated therewith, or may lock it to the bearing 30ª to prevent rotation. The gear 37 remains continually in mesh with the gear 36.

48 is a winding drum or reel for a haulage cable 48ª. This drum has a hub 49 which is rotatably mounted on the shaft 34. The hub 49 is provided with an annular recess 50 and into the outer part of this recess there projects a flange 51 on the hub 35. A number of friction disks 52 are mounted in the recess 50. The disks are arranged in two series, the disks of one series alternating with those of the other. The disks of one series are suitably secured at their peripheries to the flange 51 and the disks of the other series are secured to the inner part of the hub 49. At one end the disks are held against longitudinal movement by engagement with the hub 35. At the other end the disks are engaged by a plate 53 on the drum hub 49.

A dust proof ball thrust bearing 54 is provided between the hub 35 and the standard 33.

55 is a ring rotatably mounted on the shaft 34. Interposed between this ring and the hub 49 of the reel 48 is a dust proof ball bearing 56. The ring 55 is provided with beveled teeth 57 which engage and mesh with oppositely beveled teeth 58 on the standard 33ª. The ring 55 is provided with an upstanding arm 59 by means of which it can be rotated through a small angle. The rotation of the ring can be effected by the operator by means of a hand lever 60 which is connected with the arm 59 by means of a link 61. The lever 60 may be held in adjusted position by engagement with the teeth 60ª. When the ring is moved in the direction indicated by the arrow in Fig. 4 the teeth 57 are made to ride above the teeth 58 and to cause the ring and the reel 48 to be moved longitudinally of the shaft 34. This longitudinal movement of the reel causes the disks 52 to be pressed together and to transmit power to the reel from the hub 34.

62 is a U-shaped frame mounted at its lower end on a transverse pivot pin 63.

64 is a transverse shaft rotatably mounted in bearings 65, 65 carried on the frame 62 between its ends.

66 is an electric conductor reel secured upon the shaft 64.

67 is a conductor cable connected with the reel to be wound thereon. The free end of the cable 67 is carried backward over the locomotive to the operator's end by suitable guides and supports 67ª. The inner end of this cable is connected to a collector ring 68 which is engaged by a brush 69 for conducting the current to the motor 6.

At the end of the shaft 31 opposite to the gear 32 is a sheave 70. Secured to the shaft 64 in alinement with the sheave 70 is a second sheave 71. An endless rope belt 72 passes over the two sheaves for the transmission of power. As will be observed from the drawings, the frame 62 is positioned at an angle such that the weight of the reel tends to cause the movement of the frame and the sheave 71 to tension the belt 72. This tension may be varied, however, by moving the frame 62 forward or backward by means of the link 73 which is connected at its forward end to the frame and at its rear end to a hand lever 74. This hand lever may be locked in adjusted position by means of a segment 75.

When it is desired to cause the locomotive to move into a mine entry or room which is not provided with a trolley wire the free end of the electric cable 67 is connected to the trolley wire in the main entry and current is supplied to the motor 6 through the cable. As the locomotive advances the cable is permitted to be unwound from the reel. Preferably during unwinding the frame 62 is positioned so that the rope belt 72 is slack. The rotation of the reel is then entirely dependent upon cable tension. When it is desired to cause the locomotive to return the frame 62 is moved to tension the rope belt 72. The reel 66 will now be driven in the winding direction by power transmitted through the motor 6. The speed ratio is such that the tendency will be for the reel to rotate faster than the cable will permit. This insures a tension on the cable at all times during winding, the difference in speed being taken care of by slippage of the belt on the sheaves.

When the haulage cable is to be used current may be transmitted to the motor either through the trolley pole or through the cable as conditions require. If the locomotive is at rest, the main axle clutch is disengaged by means of the hand wheel 28 and the sleeve 38 is thrown to bring the clutch teeth 39 and 40 into engagement. The gear 36 and the hub 35 are then positively connected with the motor to be driven thereby. If a car is to be hauled the cable is unwound from the reel, the clutch 52 being disengaged. After the free end of the cable has been secured to the car the ring 55 is moved by means of the hand lever 60 and the clutch 52 is engaged to cause the drum 48 to be rotated by the hub 35. The clutch will, for any given position of adjustment, transmit but a limited amount of power. The clutch, therefore serves as a safety device to prevent sufficient power being transmitted to break the cable in case its free end should become fastened in any way.

It will be observed that during winding of the haulage cable upon the drum the locomotive may at the same time be moved along the track by causing the engagement of the clutch at 18. If current is to be supplied through the cable the cable reel will at the same time be operative.

It is frequently more convenient after hauling a car up to the locomotive to depend upon the cable 48$^a$ as a means of attachment for the car instead of using the ordinary coupling means. When such use is to be made of the cable the gear 37 is shifted out of engagement with the clutch teeth 40 and into engagement with the clutch teeth 42 on the bearing 30$^a$. The gear 37 is in this way locked against rotation and serves to hold the gear 36 and the reel 48 against rotation, the clutch 52 being engaged.

What I claim is:

1. In an electric locomotive, the combination with a main frame, axles and track wheels, of two rotatable reels mounted at one end of the locomotive for rotation about transverse horizontal axes substantially in alinement with each other, a cable secured to one reel to be wound thereon and adapted to be connected at its other end to a car for haulage purposes, an electric conductor cable secured to the other reel for winding thereon and adapted to be connected at its free end to a fixed electric conductor, a motor, an electrical connection between the cable and the motor, and power transmitting mechanism between the motor and the two reels comprising a manually operable device for controlling the rotation of one reel and a second manually operable device for controlling the rotation of the other reel.

2. In an electric locomotive, the combination with a main frame, axles and track wheels, of a driving motor, a gear mounted for rotation concentrically with one of the axles but independently thereof, means for driving the gear from the motor, a manually controllable clutch between the gear and the said axle, a transverse rotatable shaft, a power connection independent of the said clutch between the gear and the shaft, a rotatably mounted reel, a cable secured to the reel to be wound thereon, the free end of the cable being adapted to be connected with a car for haulage purposes, a manually controllable power connection between the shaft and the reel, a second rotatably mounted reel, an electric conductor cable secured to the reel to be wound thereon, an electrical connection between the cable and the motor, and a manually controllable power connection between the shaft and the second reel.

3. In an electric locomotive, the combination with a main frame, axles and track wheels, of two rotatable reels mounted at one end of the locomotive for rotation about transverse horizontal axes substantially in alinement with each other, a cable secured to one reel to be wound thereon and adapted to be connected at its other end to a car for haulage purposes, an electric conductor cable secured to the other reel for winding thereon and adapted to be connected at its free end to a fixed electric conductor, a motor, an electrical connection between the cable and the motor, and power transmitting mechanism between the motor and the two reels comprising a transverse horizontal shaft operatively connected to the motor, means including a manually operable clutch between the shaft and one reel and other means including a second manually operable clutch between the said shaft and the other reel.

4. In an electric locomotive the combination with a main frame, axles and track wheels, of a motor, a haulage cable adapted to be connected at one end to a car, a reel for winding the cable, a manually controllable friction clutch having one element connected with the reel, a second clutch between the motor and the other element of the friction clutch, manually operable means for opening and closing the second clutch, and means for locking the second element of the friction clutch against rotation simultaneously with the opening of the second clutch.

5. In an electric locomotive, the combination with a main frame, axles and track wheels, of a motor, a manually controllable clutch interposed between the motor and one of the axles, a rotatable shaft, power connections for permanently connecting the shaft with the motor to be rotated thereby, a gear rotatable on the shaft, manually controllable means for clutching the gear to the shaft, manually controllable means for locking the gear against rotation, a rotatable reel, a cable connected with the reel to be wound thereon, and adapted to be connected at its free end with a car for haulage purposes, a power connection between said gear and the reel, a second rotatable reel, an electric conductor cable connected with the reel to be wound thereon and adapted to be connected at its free end with a fixed electric conductor, and a manually controllable power connection between the shaft and the second reel.

6. In an electric locomotive, the combination with a main frame, axles and track wheels, of a motor, a manually controllable clutch interposed between the motor and one of the axles, a rotatable shaft, power connections for permanently connecting the shaft with the motor to be rotated thereby, a gear slidably and rotatably mounted on the shaft and provided with clutch teeth at each end, teeth on the shaft for engaging with the clutch teeth at one end of the gear, non-rotatable teeth for engaging with the clutch teeth at the other end of the gear, manually controllable means for shifting the gear to bring its clutch teeth into engagement with the clutch teeth on the shaft or with the non-rotating clutch teeth, a rotatable reel, a cable connected with the reel to be wound thereon and adapted to be connected at its free end with a car for haulage purposes, a power connection between said gear and the reel, a second rotatable reel, an electric conductor cable connected at its free end with a fixed conductor, and a manually controllable power connection between the shaft and the second reel.

In testimony whereof I affix my signature, in presence of two witnesses.

FREDERICK C. COSEO.

Witnesses:
A. W. READ,
DUDLEY T. FISHER.

Copies of this patent may be obtained for five cents each, by addressing the "Commissioner of Patents, Washington, D. C."